United States Patent
Zhao et al.

(10) Patent No.: US 9,954,893 B1
(45) Date of Patent: Apr. 24, 2018

(54) TECHNIQUES FOR COMBATING MAN-IN-THE-BROWSER ATTACKS

(71) Applicant: Shape Security, Inc., Palo Alto, CA (US)

(72) Inventors: Yao Zhao, Fremont, CA (US); Xinran Wang, San Ramon, CA (US)

( * ) Notice: Subject to any disclaimer, the term of this patent is extended or adjusted under 35 U.S.C. 154(b) by 0 days.

(21) Appl. No.: 14/861,906

(22) Filed: Sep. 22, 2015

Related U.S. Application Data

(60) Provisional application No. 62/054,295, filed on Sep. 23, 2014.

(51) Int. Cl.
*H04L 29/06* (2006.01)
*G06F 17/30* (2006.01)

(52) U.S. Cl.
CPC ...... *H04L 63/1466* (2013.01); *G06F 17/3089* (2013.01); *H04L 63/1416* (2013.01); *H04L 63/1491* (2013.01)

(58) Field of Classification Search
None
See application file for complete search history.

(56) References Cited

U.S. PATENT DOCUMENTS

| | | | |
|---|---|---|---|
| 5,974,549 A | 10/1999 | Golan | |
| 7,058,699 B1 | 6/2006 | Chiou et al. | |
| 7,174,565 B2 | 2/2007 | Kadyk et al. | |
| 7,180,895 B2 | 2/2007 | Smith | |
| 7,334,254 B1 | 2/2008 | Boydstun et al. | |
| 7,398,553 B1 | 7/2008 | Li | |
| 7,424,720 B2 | 9/2008 | Chagoly | |
| 7,464,326 B2 | 12/2008 | Kawai et al. | |
| 7,480,385 B2 | 1/2009 | Weber | |
| 7,500,099 B1 | 3/2009 | McElwee et al. | |
| 7,707,223 B2 | 4/2010 | Zubenko et al. | |
| 7,849,502 B1 | 12/2010 | Bloch et al. | |
| 7,870,610 B1 | 1/2011 | Mitchell et al. | |
| 7,895,653 B2 | 2/2011 | Calo et al. | |
| 8,020,193 B2 | 9/2011 | Bhola et al. | |
| 8,170,020 B2 | 5/2012 | Oliver et al. | |
| 8,195,953 B1 | 6/2012 | Yue et al. | |
| 8,200,958 B2 | 6/2012 | Coppola et al. | |
| 8,225,401 B2 | 7/2012 | Sobel et al. | |
| 8,266,202 B1 | 9/2012 | Colton et al. | |

(Continued)

FOREIGN PATENT DOCUMENTS

| | | |
|---|---|---|
| CN | 101471818 | 12/2007 |
| WO | WO2008/095018 | 8/2008 |

(Continued)

OTHER PUBLICATIONS

Anderson et al., "Measuring the Cost of Cybercrime," 2012 Workshop on the Economics of Information Security (WEIS), [retrieved on Oct. 15, 2013]. Retrieved from the Internet: URL:http://web.archive.org/web/20130623080604/http://weis2012.econinfosec.org/papers/Anderson_WEIS2012.pdf>, 31 pages, Jun. 2012.

(Continued)

*Primary Examiner* — Saleh Najjar
*Assistant Examiner* — Louis Teng

(57) ABSTRACT

Methods and apparatus are described for automatically modifying web page code. Specific implementations relate to the modification of web page code for the purpose of combatting Man-in-the-Browser (MitB) attacks.

24 Claims, 5 Drawing Sheets

(56) References Cited

U.S. PATENT DOCUMENTS

| | | | |
|---|---|---|---|
| 8,332,952 B2 | 12/2012 | Zhang et al. |
| 8,347,396 B2 | 1/2013 | Grigsby et al. |
| 8,453,126 B1 | 5/2013 | Ganelin |
| 8,527,774 B2 | 9/2013 | Fallows et al. |
| 8,555,388 B1 | 10/2013 | Wang et al. |
| 8,561,193 B1 | 10/2013 | Srivastava et al. |
| 8,578,499 B1 | 11/2013 | Zhu et al. |
| 8,589,405 B1 | 11/2013 | Estan |
| 8,627,479 B2 | 1/2014 | Wittenstein et al. |
| 8,650,648 B2 | 2/2014 | Howard et al. |
| 8,677,481 B1 | 3/2014 | Lee |
| 8,689,330 B2 | 4/2014 | Sinn et al. |
| 8,762,962 B2 | 6/2014 | Ben-Artzi et al. |
| 8,869,281 B2 | 10/2014 | Call et al. |
| 8,997,226 B1 | 3/2015 | Call et al. |
| 9,225,729 B1 | 12/2015 | Moen |
| 9,225,737 B2 | 12/2015 | Call |
| 9,258,328 B2 | 2/2016 | Ibatullin et al. |
| 9,338,143 B2 | 5/2016 | Hansen et al. |
| 9,456,050 B1 | 9/2016 | Lepeska |
| 9,609,006 B2 | 3/2017 | Call |
| 9,680,850 B2 | 6/2017 | Rapaport et al. |
| 9,705,902 B1 | 7/2017 | Call et al. |
| 2002/0099827 A1 | 7/2002 | Shah et al. |
| 2002/0199116 A1 | 12/2002 | Hoene et al. |
| 2004/0088651 A1 | 5/2004 | McKnight et al. |
| 2004/0162994 A1 | 8/2004 | Cohen et al. |
| 2005/0108554 A1 | 5/2005 | Rubin |
| 2005/0216770 A1 | 5/2005 | Rowett et al. |
| 2005/0172338 A1 | 8/2005 | Sandu |
| 2005/0198099 A1 | 9/2005 | Motsinger |
| 2005/0240999 A1 | 10/2005 | Rubin et al. |
| 2005/0251536 A1 | 11/2005 | Harik |
| 2006/0053295 A1 | 3/2006 | Madhusudan et al. |
| 2006/0101047 A1 | 5/2006 | Rice |
| 2006/0230288 A1 | 10/2006 | Fox |
| 2006/0288418 A1 | 12/2006 | Yang et al. |
| 2007/0011295 A1 | 1/2007 | Hansen |
| 2007/0064617 A1 | 3/2007 | Reves |
| 2007/0088955 A1 | 4/2007 | Lee |
| 2007/0118669 A1 | 5/2007 | Rand |
| 2007/0234070 A1 | 10/2007 | Horning |
| 2008/0130940 A1 | 6/2008 | Whitelaw |
| 2008/0183902 A1 | 7/2008 | Cooper et al. |
| 2008/0208785 A1* | 8/2008 | Trefler .................... H04L 67/02 706/47 |
| 2008/0222736 A1 | 9/2008 | Boodaei et al. |
| 2009/0007243 A1 | 1/2009 | Boodaei et al. |
| 2009/0070459 A1 | 3/2009 | Cho et al. |
| 2009/0099988 A1 | 4/2009 | Stokes et al. |
| 2009/0144829 A1 | 6/2009 | Grigsby et al. |
| 2009/0193513 A1 | 7/2009 | Agarwal et al. |
| 2009/0241174 A1 | 9/2009 | Rajan et al. |
| 2009/0292791 A1 | 11/2009 | Livshits |
| 2010/0088404 A1 | 4/2010 | Mani |
| 2010/0100927 A1 | 4/2010 | Bhola et al. |
| 2010/0106611 A1 | 4/2010 | Paulsen |
| 2010/0142382 A1 | 6/2010 | Jungck et al. |
| 2010/0191962 A1 | 7/2010 | Yan et al. |
| 2010/0218253 A1 | 8/2010 | Sutton |
| 2010/0235637 A1 | 9/2010 | Lu et al. |
| 2010/0235910 A1 | 9/2010 | Ku et al. |
| 2010/0257354 A1* | 10/2010 | Johnston .............. G06F 21/6209 713/153 |
| 2010/0287132 A1 | 11/2010 | Hauser |
| 2011/0015917 A1 | 1/2011 | Wang et al. |
| 2011/0035733 A1 | 2/2011 | Horning |
| 2011/0131416 A1 | 6/2011 | Schneider |
| 2011/0154308 A1 | 6/2011 | Lobo |
| 2011/0173526 A1* | 7/2011 | Schwarzbauer ........ G06F 11/36 715/234 |
| 2011/0231305 A1 | 9/2011 | Winters |
| 2011/0239113 A1 | 9/2011 | Hung et al. |
| 2011/0320816 A1 | 12/2011 | Yao et al. |
| 2012/0022942 A1 | 1/2012 | Holloway et al. |
| 2012/0090030 A1 | 4/2012 | Rapaport et al. |
| 2012/0117649 A1 | 5/2012 | Holloway et al. |
| 2012/0124372 A1 | 5/2012 | Dilley et al. |
| 2012/0198528 A1 | 8/2012 | Baumhof |
| 2012/0216251 A1 | 8/2012 | Kumar et al. |
| 2012/0254727 A1 | 10/2012 | Jain |
| 2012/0255006 A1 | 10/2012 | Aly et al. |
| 2013/0055287 A1 | 2/2013 | Pope et al. |
| 2013/0061055 A1 | 3/2013 | Schibuk |
| 2013/0091582 A1 | 4/2013 | Chen et al. |
| 2013/0198607 A1 | 8/2013 | Mischook et al. |
| 2013/0263264 A1 | 10/2013 | Klein et al. |
| 2013/0273882 A1 | 10/2013 | Walsh |
| 2013/0340043 A1 | 12/2013 | Zarei et al. |
| 2014/0040051 A1 | 2/2014 | Ovick |
| 2014/0053059 A1 | 2/2014 | Weber et al. |
| 2014/0096194 A1 | 4/2014 | Bhogavilli |
| 2014/0283038 A1 | 9/2014 | Call et al. |
| 2014/0298469 A1* | 10/2014 | Marion .................... G06F 21/55 726/23 |
| 2014/0304816 A1* | 10/2014 | Klein ...................... G06F 21/56 726/23 |
| 2014/0310392 A1 | 10/2014 | Ho |
| 2015/0058992 A1 | 2/2015 | El-Moussa |
| 2015/0067031 A1 | 3/2015 | Acharya |
| 2015/0112892 A1 | 4/2015 | Kaminsky et al. |
| 2015/0262183 A1 | 9/2015 | Gervais |
| 2015/0278491 A1 | 10/2015 | Horning |
| 2015/0339479 A1 | 11/2015 | Wang et al. |
| 2016/0005029 A1 | 1/2016 | Henry |
| 2016/0119344 A1* | 4/2016 | Freitas Fortuna dos Santos .......................... H04L 63/1466 726/7 |
| 2016/0342793 A1 | 11/2016 | Hidayat |
| 2016/0344769 A1 | 11/2016 | Li |
| 2017/0012960 A1 | 1/2017 | Idika |
| 2017/0013012 A1 | 1/2017 | Hansen |
| 2017/0201540 A1 | 7/2017 | Call |
| 2017/0237766 A1 | 8/2017 | Mattson |
| 2017/0257385 A1 | 9/2017 | Overson |

FOREIGN PATENT DOCUMENTS

| | | |
|---|---|---|
| WO | WO2008/095031 | 8/2008 |
| WO | WO2008/130946 | 10/2008 |
| WO | WO 2017/007705 | 1/2017 |
| WO | WO 2017/007936 | 1/2017 |
| WO | WO 2017/074622 | 5/2017 |

OTHER PUBLICATIONS

Boston University Information Services & Technology [online]. "Understanding Authentication, Authorization, and Encryption," published before Jul. 1, 2014, [Retrieved only Jul. 1, 2014]. Retrieved from Internet: <URL: http://www.bu.edu/tech/services/security/resources/bestpractice/auth/>. 4 pages.

Cova et al., "Detection and Analysis of Drive-by-Download Attacks and Malicious JavaScript Code," World Wide Web Conference Committee, Apr. 26-30, 2010. Retrieved from the Internet <URL: http://www.cs.ucsb.edu/~vigna/publications/2010_cova_kruegel_vigna_Wepawet.pdf>, 10 pages.

Currie et al., "In-the-wire authentication: Protecting client-side critical data fields in secure network transactions," 2nd International Conference on Adaptive Science and Technology, 2009, pp. 232-237.

Egele et al., "Defending Browsers against Drive-by Downloads: Mitigating Heap-spraying Code Injection Attacks," Detection of Intrusions and Malware, and Vulnerability Assessment Lecture Notes in Computer Science, 5587:88-106. Retrieved from the Internet: <URL: http://anubis.seclagb.tuwien.ac.at/papers /driveby.pdf>, 19 pages, 2009.

Entrust, "Defeating Man-in the Browser Malware," Entrust.com [online] Sep. 2012 [retrieved Oct. 15, 2013]. Retrieved from the Internet: <URL: http//download.entrust.com/resources/download.cfm/24002/>, 18 pages.

(56) References Cited

OTHER PUBLICATIONS

Indiana University [online]. "Authentication vs. Authorization," published before Jul. 1, 2014, [Retrieved on Jul. 1, 2014]. Retrieved from Internet: <URL: https://protect.iu.edu/cybersecurity/authn-authz>. 3 pages.

Krebs on Security, In-depth security news and investigation, "A Closer Look at Rapport from Trusteer", dated Apr. 29, 2010.

Marcus and Sherstobitoff, "Dissecting Operation High Roller," McAfee [online] 2012 [retrieved on Oct. 15, 2013]. Retrieved from the Internet <URL: http//www.mcafee.com/us/resources/reports/rpoperations-high-roller.pdf>, 20 pages.

Oh, "Recent Java exploitation trends and malware," Black Hat USA 2012, Retrieved from the Internet; <URL: https://media.blackhat.com/bh-us-12/Briefings/Oh/GBH_US_12_Oh_Recent_Java_Exploitation_Trends - and_Malware_WP.pdf>, 27 pages.

Pattabiraman and Zorn, "DoDOM: Leveraging DOM Invariants for Web 2.0 Application Robustness Testing," 2010 IEEE 21st International Symposium on Software Reliability Engineering, pp. 191-200.

Rieck et al. "Cujo: Efficient Detection and Prevention of Drive-by-Download Attacks," ACSAC 2010, Austin, Texas, Dec. 6-10, 9 pages.

Shackleford, D. "Application Whitelisting: Enhancing Host Security," SANS Institute Reading Room, Oct. 2009, 16 pages.

Wikipedia [online]. "MD5," Jun. 30, 2014, [Retrieved on Jul. 1, 2014]. Retrieved from Internet: <URL: http://en.wikipedia.org/wiki/MD5>. 12 pages.

Xinran Wang, Tadayoshi Kohno, and Bob Blakley entitled "Polymorphism as a Defense for Automated Attack of Websites, Applied Cryptography and Network Security (2014)", 18 pages.

NOA, dated Feb. 21, 2017, re: Shekyan et al., U.S. Appl. No. 14/502,893, filed Sep. 30, 2014.

CTNF, dated Mar. 9, 2017, re: Siying Yang, U.S. Appl. No. 14/925,547, filed Oct. 28, 2015.

NOA, dated Apr. 23, 2015, re: Justin Call, U.S. Appl. No. 13/527,025, filed Jun. 19, 2012.

CTFR, dated Feb. 10, 2015, re: Justin Call, U.S. Appl. No. 13/527,025, filed Jun. 19, 2012.

CTNF, dated Nov. 2, 2012, re: Justin Call, U.S. Appl. No. 13/527,025, filed Jun. 19, 2012.

CTFR, dated Apr. 23, 2013, re: Justin Call, U.S. Appl. No. 13/527,025, filed Jun. 19, 2012.

CTNF, dated Aug. 4, 2014, re: Justin Call, U.S. Appl. No. 13/527,025, filed Jun. 19, 2012.

NOA, dated Jun. 1, 2015, re: Justin Call, U.S. App. No. 13/527,025, filed Jun. 19, 2012.

CTNF, dated Feb. 26, 2015, re: Justin Call, U.S. Appl. No. 14/055,576, filed Oct. 16, 2013.

NOA, dated Aug. 21, 2015, re: Justin Call, U.S. Appl. No. 14/055,576, filed Oct. 16, 2013.

CTNF, dated Dec. 24, 2014, re: Justin Call, U.S. Appl. No. 14/055,583, filed Oct. 16, 2013.

CTNF, dated May 20, 2015, re: Justin Call, U.S. Appl. No. 14/110,659, filed Oct. 8, 2013.

NOA, dated Aug. 19, 2015, re: Daniel Moen, U.S. Appl. No. 14/160,107, filed Jan. 21, 2014.

CTNF, dated Jun. 27, 2014, re: Justin Call, U.S. Appl. No. 14/255,248, filed Apr. 17, 2014.

NOA, dated Nov. 19, 2014, re: Justin Call, U.S. Appl. No. 14/255,248, filed Apr. 17, 2014.

NOA, dated Dec. 24, 2014, re: Justin Call, U.S. Appl. No. 14/255,248, filed Apr. 17, 2014.

NOA, dated Aug. 24, 2015, re: Subramanian Varadarajan, U.S. Appl. No. 14/290,805, filed May 29, 2014.

CTFR, dated Jan. 14, 2015, re: Subramanian Varadarajan, U.S. Appl. No. 14/290,805, filed May 29, 2014.

CTNF, dated Sep. 5, 2014, re: Subramanian Varadarajan, U.S. Appl. No. 14/290,805, filed May 29, 2014.

CTFR, dated Dec. 30, 2014, re: Justin Call, U.S. Appl. No. 14/290,835, filed May 29, 2014.

CTNF, dated Jul. 30, 2014, re: Justin Call, U.S. Appl. No. 14/290,835, filed May 29, 2014.

NOA, dated Mar. 11, 2015, re: Justin Call, U.S. Appl. No. 14/290,835, filed May 29, 2014.

CTNF, dated Sep. 1, 2015, re: Ariya Hidayat, U.S. Appl. No. 14/293,895, filed Jun. 2, 2014.

NOA, dated Mar. 30, 2016, re: Ariya Hidayat, U.S. Appl. No. 14/293,895, filed Jun. 2, 2014.

NOA, dated Oct. 24, 2016, re: Sergey Shekyan, U.S. Appl. No. 14/502,893, filed Sep. 30, 2014.

CTNF, dated Apr. 20, 2016, re: Sergey Shekyan, U.S. Appl. No. 14/502,893, filed Sep. 30, 2014.

NOA, dated Jul. 21, 2016, re: Siying Yang, U.S. Appl. No. 14/541,062, filed Nov. 13, 2014.

CTNF, dated Feb. 23, 2016, re: Siying Yang, U.S. Appl. No. 14/541,062, filed Nov. 13, 2014.

CTNF, dated May 6, 2016, re: Yao Zhao, U.S. Appl. No. 14/552,331, filed Nov. 25, 2014.

NOA, dated Aug. 17, 2016, re: Yao Zhao, U.S. Appl. No. 14/552,331, filed Nov. 25, 2014.

CTNF, dated May 8, 2015, re: Timothy Peacock, U.S. Appl. No. 14/570,632, filed Dec. 15, 2014.

NOA, dated Dec. 18, 2015, re: Timothy Peacock, U.S. Appl. No. 14/570,632, filed Dec. 15, 2014.

CTNF, dated Mar. 17, 2016, re: Justin Call, U.S. Appl. No. 14/672,879, filed Mar. 30, 2015.

CTNF, dated Apr. 28, 2016, re: Ariya Hidayat, U.S. Appl. No. 14/673,669, filed Mar. 30, 2015.

NOA, dated Nov. 21, 2016, re: Ariya Hidayat, U.S. Appl. No. 14/673,669, filed Mar. 30, 2015.

NOA, dated Dec. 22, 2016, re: Ariya Hidayat, U.S. Appl. No. 14/673,669, filed Mar. 30, 2015.

NOA, dated Jan. 9, 2017, re: Ariya Hidayat, U.S. Appl. No. 14/673,669, filed Mar. 30, 2015.

CTNF, dated Nov. 10, 2016, re: Nwokedi Idika, U.S. Appl. No. 14/728,621, filed Jun. 2, 2015.

CTNF, dated Oct. 21, 2016, re: Justin Call, U.S. Appl. No. 14/738,913, filed Jun. 14, 2015.

NOA, dated Mar. 16, 2017, re: Justin Call, U.S. Appl. No. 14/738,913, filed Jun. 14, 2015.

CTNF, dated Mar. 14, 2016, re: Justin Call, U.S. Appl. No. 14/874,717, filed Oct. 5, 2015.

NOA, dated Apr. 28, 2016, re: Justin Call, U.S. Appl. No. 14/874,717, filed Oct. 5, 2015.

CTFR, dated Aug. 12, 2016, re: Subramanian Varadarajan, U.S. Appl. No. 14/923,603, filed Oct. 27, 2015.

NOA, dated Dec. 1, 2016, re: Subramanian Varadarajan, U.S. Appl. No. 14/923,603, filed Oct. 27, 2015.

NOA, dated Nov. 16, 2016, re: Justin Call, U.S. Appl. No. 14/980,409, filed Dec. 28, 2015.

CTNF, dated Aug. 2, 2016, re: Justin Call, U.S. Appl. No. 14/980,409, filed Dec. 28, 2015.

CTFR, dated Aug. 23, 2016, re: Siying Yang, U.S. Appl. No. 15/011,172, filed Jan. 29, 2016.

CTNF, dated Apr. 18, 2016, re: Siying Yang, U.S. App. No. 15/011,172, filed Jan. 29, 2016.

CTFR, dated Nov. 18, 2016, re: Justin D. Call, U.S. Appl. No. 14/672,879, filed Mar. 30, 2015.

CTNF, dated Jun. 1, 2017, re: Siying Yang, U.S. Appl. No. 14/942,769, filed Nov. 16, 2015.

NOA, dated Jun. 1, 2017, re: Sergey Shekyan, U.S. Appl. No. 14/502,893, filed Sep. 30, 2014.

CTNF, dated Apr. 4, 2017, re: Jarrod Overson, U.S. Appl. No. 15/069,667, filed Mar. 14, 2016.

CTNF, dated Jun. 2, 2017, re: Ariya Hidayat, U.S. Appl. No. 15/224,978, filed Aug. 1, 2016.

CTNF, dated Apr. 7, 2017, re: Yao Zhao, U.S. Appl. No. 14/861,906, filed Sep. 22, 2015.

CTNF, dated May 25, 2017, re: Daniel G. Moen, U.S. Appl. No. 14/980,231, filed Dec. 28, 2015.

(56) References Cited

OTHER PUBLICATIONS

CTNF, dated Jul. 26, 2017, re: Bei Zhang, U.S. Appl. No. 14/859,084, filed Sep. 18, 2015.
CTNF, dated Jul. 26, 2014, re: Bei Zhang, U.S. Appl. No. 14/859,084, filed Sep. 18, 2015.
CTNF, dated Jun. 21, 2017, re: Zhiwei Li, U.S. Appl. No. 14/718,736, filed May 21, 2015.
Intrusion Detection using Sequences of System calls, Aug. 18, 1998.
Design and Implementation of a Distributed Virtual Machine for Networked Computers, 1999.
International Search Report, dated Apr. 22, 2016, PCT/US16/18081.
International Search Report, dated Jan. 19, 2016, PCT/US15/49024.
International Search Report, dated Dec. 22, 2015, PCT/US15/52030.
International Search Report, dated Aug. 25, 2015, PCT/US15/32060.
International Search Report, dated Sep. 22, 2016, PCT/US16/40645.
International Search Report, dated Feb. 16, 2017, PCT/US16/53472.
International Search Report, dated Oct. 11, 2016, PCT/US16/41337.
International Search Report, dated Jul. 1, 2016, PCT/US16/25092.
International Search Report, dated Apr. 7, 2016, PCT/US15/62206.
International Search Report, dated Aug. 1, 2014, PCT/US14/24232.
International Search Report, dated Jun. 3, 2013, PCT/US13/26516.
CTNF, dated Aug. 30, 2017, re: Justin D. Call, U.S. Appl. No. 15/470,715, filed Mar. 27, 2017.
CTFR, dated Sep. 5, 2017, re: Siying Yang, U.S. Appl. No. 14/925,547, filed Oct. 28, 2015.
CTNF, dated Dec. 13, 2017, re: Justin D. Call, U.S. Appl. No. 15/645,787, filed on Jul. 10, 2017.
NOA, dated Dec. 18, 2017, re: Yao Zhao, U.S. Appl. No. 14/861,906, filed on Sep. 22, 2015.
NOA, dated Jan. 5, 2018, re: Yao Zhao, U.S. Appl. No. 14/861,906, filed on Sep. 22, 2015.
NOA, dated Jan. 9, 2018, re: Justin D. Call, U.S. Appl. No. 15/470,715, filed on Mar. 27, 2017.
CTFR, dated Jan. 25, 2018, re:King, John B., U.S. Appl. No. 14/942,769, filed on Nov. 16, 2015.
CTFR, dated Oct. 30, 2017, re: Jarrod Overson, U.S. Appl. No. 15/069,667, filed on Mar. 14, 2016.
CTNF, dated Oct. 19, 2017, re:Jarrod S. Overson, U.S. Appl. No. 15/059,080, filed on Mar. 2, 2016.
NOA, dated Oct. 25, 2017, re:Michael J. Ficarra, U.S. Appl. No. 15/060,322, filed on Mar. 3, 2016.
CTNF, dated Nov. 13, 2017, re:Nwokedi Idika, U.S. Appl. No. 14/728,596, filed on Jun. 2, 2015.

* cited by examiner

TECHNIQUES FOR COMBATING MAN-IN-THE-BROWSER ATTACKS

PRIORITY DATA

This application claims priority under 35 U.S.C. 119(e) to commonly assigned U.S. Provisional Patent Application No. 62/054,295, titled "Techniques for combatting man-in-the-browser attacks", by Zhao et al., filed on Sep. 23, 2014, which is hereby incorporated by reference in its entirety and for all purposes.

BACKGROUND

Web sites and applications are vulnerable to attack by malicious third parties. In one class of attacks, often referred to as "Man-in-the-Browser" (MitB) or "Web Injection" attacks, malware in a compromised web browser injects malicious code into a web page downloaded by the browser. Such injected malicious code can alter the content of a web page. By way of example, injected code can introduce form fields into a web page that can be used by a malicious third party to steal sensitive information (e.g., user credentials, passwords, social security numbers, etc.). Some technologies, e.g., Web Tripwire and Zarathustra, have been developed to detect injected code, but many of these solutions are easily disabled by malicious third parties and can only detect, not prevent, MitB attacks.

SUMMARY

According to various implementations, methods, apparatus, systems, and computer program products are provided for modifying web page code to combat MitB attacks. According to a particular class of implementations, web page code representing a web page requested by a client device is received. The web page code is modified by transforming a portion of the web page code that includes target code and adding decoy code having one more characteristics of the target code. The one or more characteristics are related to known malware injection points. The modified web page code is transmitted to the client device.

In some implementations, transforming the portion of the web page code includes generating a polymorphic transformation of the portion of the web page code.

According to some implementations, modifying the web page code includes adding monitoring code configured to monitor the decoy code for injected code. According to a specific implementation, a notification is received from the monitoring code that the injected code was detected in the decoy code.

According to some implementations, the decoy code is configured to be obscured when rendered on a browser of the client device. According to a specific implementation, the decoy code is added to a comments section of the web page code.

A further understanding of the nature and advantages of various implementations may be realized by reference to the remaining portions of the specification and the drawings.

DETAILED DESCRIPTION

Reference will now be made in detail to specific implementations. Examples of these implementations are illustrated in the accompanying drawings. It should be noted that these examples are described for illustrative purposes and are not intended to limit the scope of this disclosure. Rather, alternatives, modifications, and equivalents of the described implementations are included within the scope of this disclosure as defined by the appended claims. In addition, specific details may be provided in order to promote a thorough understanding of the described implementations. Some implementations within the scope of this disclosure may be practiced without some or all of these details. Further, well known features may not have been described in detail for the sake of clarity.

This disclosure describes techniques for combating so-called "Man-in-the-Browser" (MitB) or "Web Injection" attacks in which malware in a compromised web browser injects code into a web page downloaded by the browser. Such injected code might be designed to insert extra fields in the web page for the purpose of stealing sensitive user information (e.g., user credentials, passwords, social security numbers, etc.). By way of illustration, certain malware infecting an end user's web browser might be designed to inject code into a login page for a banking web site. Such injected code might cause a "social security number" field to be presented in the browser immediately beneath username and password fields on the login page. Since the social security number field is presented in an otherwise legitimate login page, a user might enter her social security number along with her user name and password, assuming all fields presented are legitimate. Unfortunately, the injected code can cause her social security number to be transmitted to a malicious third party.

According to specific implementations described herein, web page code can be modified for the purpose of combatting MitB attacks. Returning to the example of the preceding paragraph, the web page code of the login page can be hidden from malware using obfuscation techniques, some of which are described below. A "honey object" can be injected into the web page code of the login page. The honey object can include a duplicate, un-obfuscated version of the form elements for the login page. As described below, the honey object can be obscured such that it is detectible by malware but not human users of the banking website. Because the honey object is not presented to users of the banking website, it serves as a decoy, in which injected code can be harmlessly quarantined.

In some implementations, a honey object can also include monitoring code that can generate a notification when malicious code is injected into the honey object. Therefore, the appropriate parties can be automatically notified of a malicious code injection, as described below. Specific implementations will now be described with reference to the accompanying figures.

Figure 1:
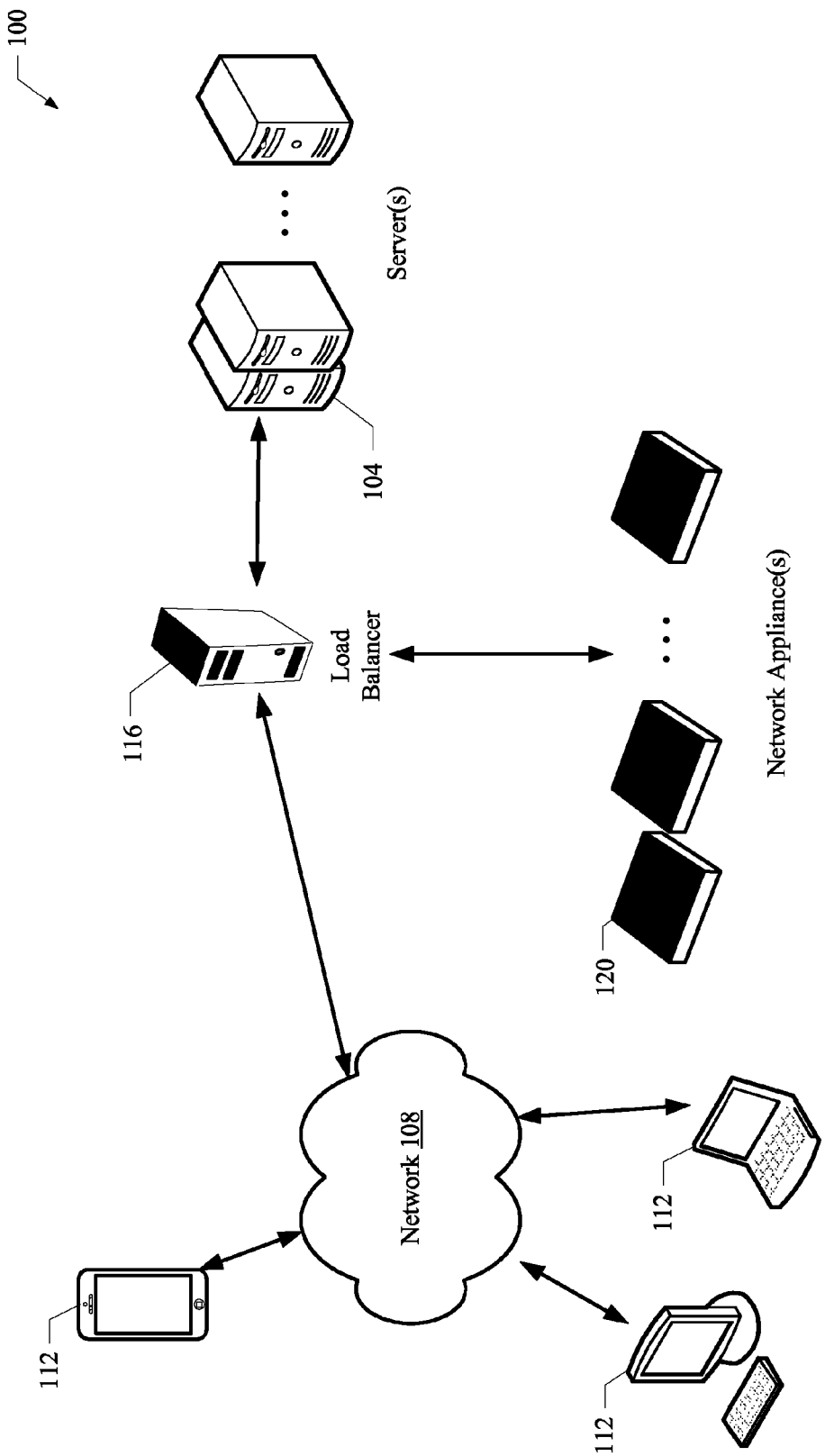
FIG. 1 is simplified diagram of a computing environment in which particular implementations enabled by the present disclosure may be practiced.

FIG. 1 illustrates an example of a computing environment 100 in which web page code is modified for the purpose of combatting MitB attacks. One or more servers 104 serve web pages via a network 108 to one or more client devices 112. Network 108 represents any subset or combination of a wide array of network environments, including the internet, public networks, private networks, local area networks, TCP/IP-based networks, telecommunications networks, wireless networks, cable networks, etc. Client devices 112 could be any device capable of requesting web pages served by server(s) 104. For instance, such devices might include a desktop computer, a laptop computer, a tablet, a smartphone, a set top box, a wearable device, etc.

A load balancer 116 acts as an intermediary between the servers 104 and the network 108, distributing source code (e.g., web pages served by servers 104) to one or more network appliances 120. The one or more network appliances 120 process at least a portion of the source code received, modifying the source code, as described below. Ultimately, the one or more network appliances 120 provide the modified source code to one or more client devices 112 via the load balancer 116 to the network 108.

Figure 2:
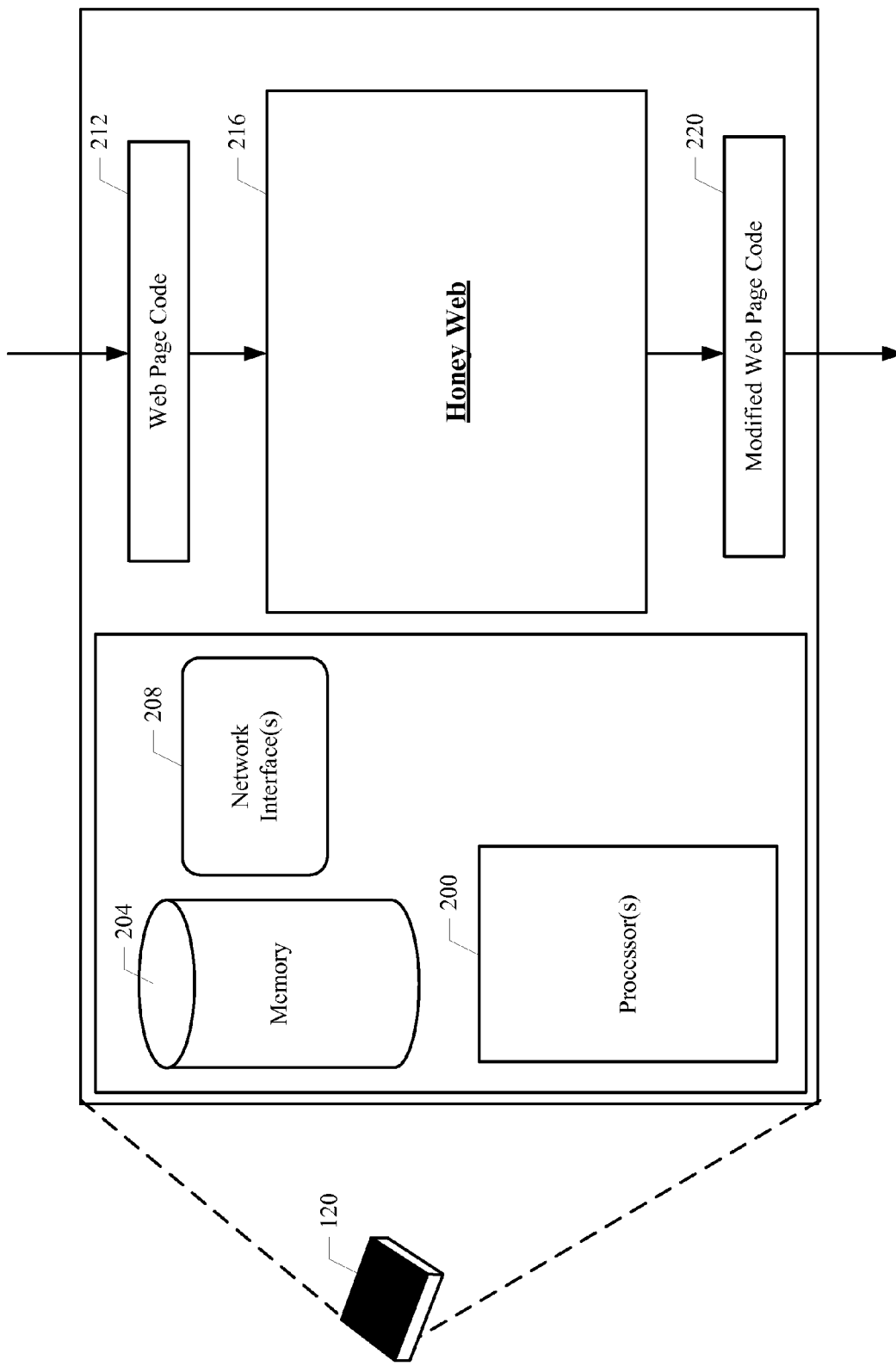
FIG. 2 is a simplified block diagram of a network appliance.

A simplified block diagram of such a network appliance 120 is shown in FIG. 2. Appliance 120 contains one or more processors 200, including one or more single or multi-core processors configured to execute stored instructions. Appliance 120 also includes one or more memories 204. Memory 204 comprises non-transitory computer-readable storage media that could potentially include a wide variety of forms of volatile and non-volatile storage media. For instance, memory 204 could include electronic storage media, magnetic storage media, optical storage media, quantum storage media, mechanical storage media, etc. Memory 204 provides storage for computer readable instructions, data structures, program modules and other data for the operation of appliance 120.

Appliance 120 also includes one or more network interfaces 208. The network interfaces 208 may be used to connect via wired or wireless connections to any of a variety of network types including, for example, cellular networks, wireless networks, the internet, public networks, private networks, wide area networks, local area networks, etc. In some implementations, appliance 120 might also include, network processors or network specific ASIC (Application-Specific Integrated Circuit) hardware chips.

Appliance 120 also includes one or more buses or other internal communications hardware or software (not shown) that allow for the transfer of data and instructions between the various modules and components of the appliance.

While appliance 120 might have many functions, this document focuses mainly on the use of appliance 120 to modify source code associated with a web page for the purpose of combatting MitB attacks. For example, appliance(s) 120 might function as web security appliances protecting servers 104. For example, appliance 120 might be a ShapeShifter® manufactured by Shape Security®, MWS1000® appliance manufactured by Juniper Networks®, or any of a wide variety of other web security products.

In one implementation, appliance 120 receives Web Page Code 212 associated with a web page through one or more network interfaces 208. The Input Web Page Code 212 is processed by Honey Web 216, which includes a series of modules that are described in greater detail below in the context of FIGS. 3 and 4. It will be understood that these and other modules may be implemented by processor(s) 200 executing code in memory 204.

After Web Page Code 212 is modified by Honey Web 216, Modified Web Page Code 220 is transmitted from the appliance 120 via the one or more network interfaces 208. In some implementations, Modified Web Page Code 220 is transmitted to a load balancer (e.g., load balancer 116 of FIG. 1) and then on to the requesting user device via a network (e.g., to one of devices 112 via network 108 as shown in FIG. 1). Alternatively, the Modified Web Page Code 220 might be transmitted directly to the user device. The Modified Web Page Code 220 may then be rendered as a web page in a browser on the user device.

It should be noted that, despite references to specific computing paradigms and software tools in this disclosure, the computer program instructions on which implementations are based may correspond to any of a wide variety of programming languages, software tools and data formats, may be stored in any type of non-transitory computer-readable storage media or memory device(s), and may be executed according to a variety of computing models including, for example, a client/server model, a peer-to-peer model, on a stand-alone computing device, or according to a distributed computing model in which various functionalities may be effected or employed at different locations. In addition, references to particular protocols in this disclosure are merely by way of example. Suitable alternatives known to those of skill in the art may be employed as appropriate for particular implementations.

Figure 3:
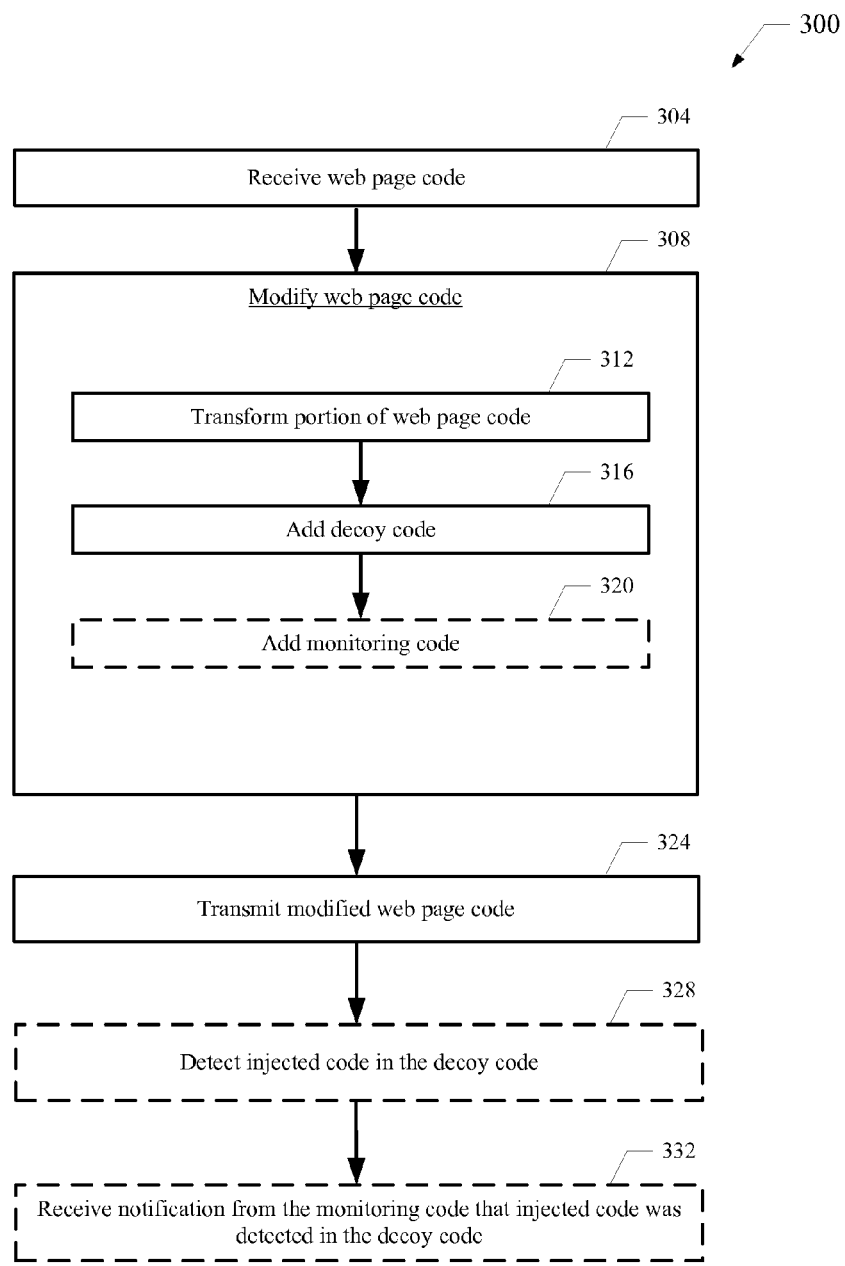
FIG. 3 is a flowchart illustrating the operation of a specific implementation in which web page code is modified to combat Man-in-the-Browser (MitB) attacks.

Referring now to FIG. 3, a particular example of a technique for modifying web page code to combat MitB attacks will be described. For illustrative purposes, the example of FIG. 3 is discussed in the context of computing environment 100 of FIG. 1. However, it should be noted that the techniques described are generally applicable to a wide variety of computing environments. It should also be noted that the example of FIG. 3 could be implemented in a variety of ways including, for instance, integrated with the operation of a network appliance such as, for example, appliance 120 described in the context of computing environment 100. Alternatively, modification of web page code as described herein might be implemented in another device (e.g., integrated with an originating web server or at an intermediate device such as a load balancer) or be distributed among multiple devices.

Web Page code representing a web page requested by a client device is received (304). The web page code can represent a web page requested by a client device, such as the login page for the banking website discussed above. The web page code can be received at network appliance 120 of FIG. 1 from Server(s) 104 by way of load balancer 116, as discussed above.

Figure 4:
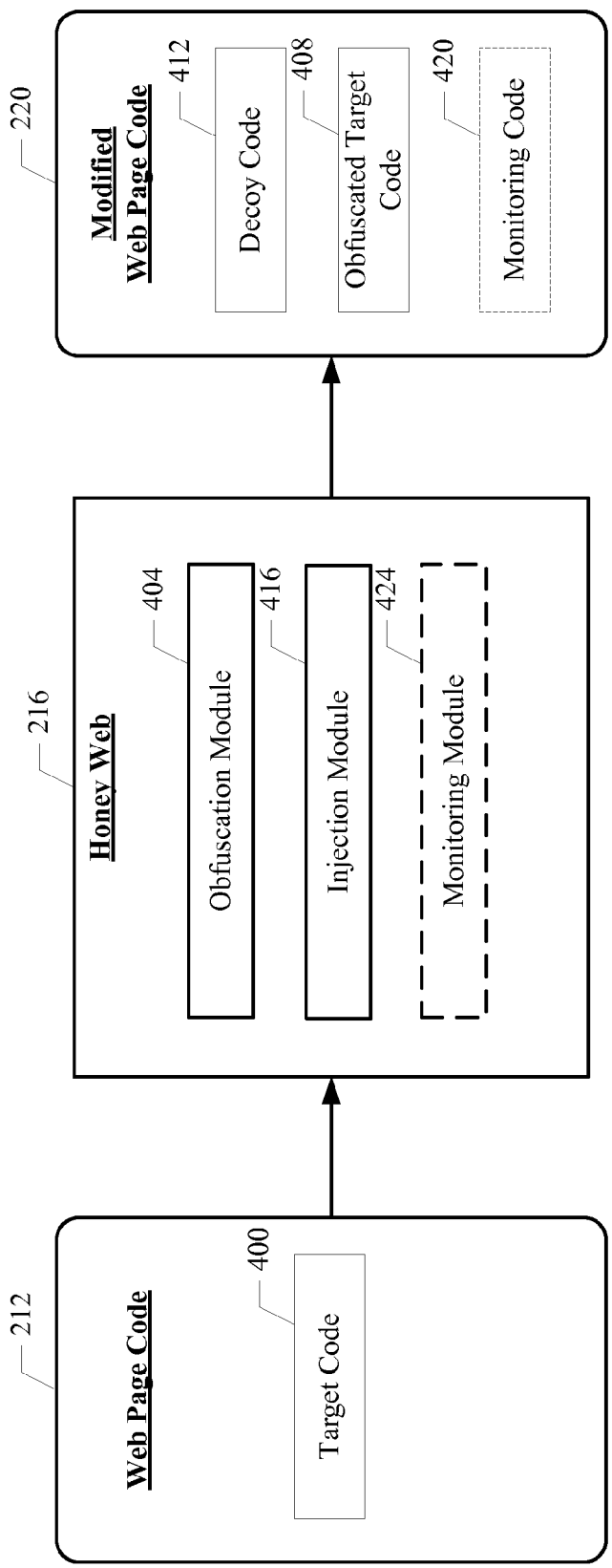
FIG. 4 is a simplified block diagram of an example of a system for modifying web page code to combat MitB attacks.

The web page code is modified (308). The modification of web page code can include a variety of steps, which can occur in a varying order. One such example is shown in 312-320 of FIG. 3 and is discussed below in the context of FIG. 4, which depicts a simplified block diagram of an example of a system for modifying web page code to combat MitB attacks. In FIG. 4, Web Page Code 212 is modified by the modules of Honey Web 216 of appliance 120 to produce Modified Web Page Code 220. Alternatively, the web page code modification process can be implemented across a variety of devices in a number of different computing environments, some of which are described below.

Returning to FIG. 3, a portion of the web page code is transformed (312). For example, as described above, a portion of the web page code that includes "target code" which might be vulnerable to MitB attacks can be obfuscated such that it is no longer detectable by the malware implementing the MitB attacks. For example, Target Code 400 can be transformed at Obfuscation Module 404 of FIG. 4 to produce Obfuscated Target Code 408.

Target Code 400 can include any web page code that could potentially be vulnerable to MitB attacks. Some examples of potentially vulnerable web page code may include code representing forms that request credentials or sensitive personal information such as login information, credit card information, a social security number, a signature, a digital signature, a credit card number, a Credit Card Verification (CCV) number, a bank account number, a Personal Identification Number (PIN), etc. Also or alternatively, potentially vulnerable web page code may include code representing seemingly harmless personal verification questions such as "What is your Mother's Maiden Name?", "In what city were you born?", etc. Potentially vulnerable web page code may also include code representing objects that request biometric information such as a retinal pattern or a fingerprint.

Additionally, potentially vulnerable web page code may include web page code that defines routing instructions for money transfers. By way of example, malware might target such code for injection to change an account number for money transfer such that a malicious third-party could re-route the transfer to him or herself.

One having skill in the art can appreciate that the types of web page code that are potentially vulnerable to MitB attacks might change over time as MitB attacks evolve. By way of example, many recent MitB attacks involve injecting code designed to create form fields to steal credentials or personal information, as described above. However, future MitB attacks may involve injecting code that is designed to achieve other malicious goals. Target Code 400 can be updated as MitB attacks evolve include any code that becomes vulnerable.

According to various implementations, the ways in which Obfuscation Module 404 transforms Target Code 400 may vary considerably. For example, obfuscation of Target Code 400 may be accomplished in accordance with techniques described in the following U.S. Patent Applications, each of which is incorporated herein by reference and forms part of this disclosure: U.S. patent application Ser. No. 14/055,646 for Protecting Against the Introduction of Alien Content filed on Oct. 16, 2013; U.S. patent application Ser. No. 14/055,704 for Safe Intelligent Content Modification filed on Oct. 16, 2013; U.S. patent application Ser. No. 14/286,733 for Polymorphic Treatment of Data Entered at Clients filed on May 23, 2014.

In one example of the obfuscation of Target Code 400, the field names of a form could be changed through a polymorphic transformation. Polymorphic transformation of web page code involves dynamically altering the ordinarily static source code associated with a web page. This makes the source code more difficult to exploit from the perspective of code-injecting malware while leaving web content viewable to the human user apparently unchanged. It should be noted that there are a number of ways to transform web page source code without changing the web page's appearance to a user. For instance, a variable (e.g., "user_name") describing an inputted username could be changed from "user_name" to a random string (e.g., "n2qi87fpr3wr"). In another example, the layers of a form field from which a username is gathered could be changed. Instead of taking all of the user name characters from a single field, the first and third characters might be entered in one field, the second character in another, etc. If the fields are overlaid in the user interface, a user cannot tell the difference between a representation of a website where all username characters are gathered from a single field and a representation where the characters are gathered from multiple overlaid fields.

A purpose of such polymorphic transformations is to create a moving target so that malicious code executing on a browser of a client device cannot use predictability of code in order to interact with the code in a malicious way. Ultimately, the process of obfuscation through polymorphic transformation of web page code can vary greatly from implementation to implementation. Further examples may be found with reference to U.S. application Ser. No. 14/055,704, U.S. application Ser. No. 14/055,646, and U.S. patent application Ser. No. 14/286,733 incorporated herein by reference above.

In another example, Obfuscation Module 404 can rewrite Target Code 400 to have a different structure (e.g., changing HTML clear text to JavaScript, etc.). Further description of rewriting target code to have a different structure can be found in a paper by Xinran Wang, Tadayoshi Kohno, and Bob Blakley entitled *Polymorphism as a Defense for Automated Attack of Websites*, Applied Cryptography and Network Security (2014), the entirety of which is incorporated herein by reference for all purposes and forms part of this disclosure.

It will be understood that obfuscation techniques evolve over time and an obfuscation module can be configured to execute the above-described obfuscation techniques and other existing obfuscation techniques, as well as yet-to-be conceived obfuscation techniques. Suitable variations will be apparent to those of skill in the art.

Returning to FIG. 3, decoy code is added to the web page code (316). For example, as shown in FIG. 4, Decoy Code 412 can be added to Web Page Code 212 at Injection Module 416. Unlike Obfuscated Target Code 408 which is rendered by a browser and presented to a user, Decoy Code 412 is not presented to a user. Therefore, as discussed above, Decoy Code 412 can form part of a honey object that is designed to be recognized by malware as a target code injection point. Since a representation of Decoy Code 412 is not presented to a user, any malicious code injected into Decoy Code 412 is quarantined and rendered harmless.

Honey objects, and decoy code included within honey objects, may be designed with reference to the specific configurations of known malware, e.g., by examining detected malware code and identifying the target code the malware is designed to exploit. Honey objects can also be designed using a more heuristic approach in which common attack vectors are taken into account. For example, MitB malware commonly employs login pages as points of attack. Decoy code may therefore be configured to appear as one or more of the forms of a login page with the actual forms being included in code which is obfuscated and/or moved elsewhere, as described above.

While decoy code is designed to attract the attention of malware residing on a client device, its presence is preferably transparent to the end user of that device, as described above. Decoy code can be made transparent to an end user of a client device in a variety of ways. By way of example, Decoy Code 412 of FIG. 4 can be injected in the Hyper Text Mark-up Language (HTML) comments section of Modified Web Page Code 220 where it will be ignored by a browser of a client device, but still attract any malware looking for its target code. Also or alternatively, by properly setting a Cascading Style Sheets (CSS) style (e.g. display=None), Decoy Code 412 can be placed inside a div or iframe that is not displayed when Modified Web Page Code 220 is rendered by a browser on a client device. Similarly, Decoy Code 412 can be placed in a single square pixel div that would likely be too small to be detected by a healthy human eye on a conventional display.

Decoy code can also be made transparent to an end user of a client device by causing a representation of decoy code to be presented outside of the screen of a client device when rendered by a browser on the client device. By way of example, Decoy Code 412 can be represented at the bottom of a web page and can be configured to continue moving down as a user scrolls downwards when navigating the web page. Also or alternatively, Decoy Code 412 can be placed behind other objects in a web page, such as images or over-lapping form elements. Other suitable variations will be apparent to those of skill in the art.

An example of a honey object including decoy code that is placed inside a div that is not displayed when rendered by a browser on a client device is shown below:

<div id="honeydiv" style="display=none">
<input name='password' id='password' type='password'>
</div>

The above example of decoy code is configured to attract malware that targets the string "<input name='password' id='password' type='password'>"

As will be appreciated, it is desirable that insertion of Decoy Code 412 of FIG. 4 not interfere with the functionality of Modified Web Page Code 220 when Modified Web Page Code 220 is rendered on a browser of a client device. For example, as shown above, Decoy Code 412 may introduce an element with an ID of "password", which may also appear in Obfuscated Target Code 408. In this case, there would be two elements with an ID of "password" in the Document Object Model (DOM) of the web page represented by Modified Web Page Code 220. Consequently, an error due to undefined behavior might occur when JavaScript calls document.getElementById ("password"), since there would be two elements with an ID of "password" in the DOM of the web page.

Such interference may be avoided in a variety ways. For example, as described above, Decoy Code 412 can be placed in the HTML comments section of a web page. In this scenario, Decoy Code 412 will not interfere with the functionality of the web page because the content of the HTML comments section does not affect the DOM of the web page.

Also or alternatively, interference may be avoided by using a dynamic ID. By way of example, the honey object shown below avoids interference caused by a duplicated ID with the addition of a simple JavaScript (bolded and underlined):

<div id="honeydiv" style="display=none">
<input name='password' id='password' type='password'>
</div>
<script type="text/javascript">
document.getElementById ('password').id="xxxx"
</script>

The addition of the above JavaScript changes the ID of "password" in the honey object, thereby avoiding the interference of two elements in the DOM of the web page having an ID of "password."

Returning to FIG. 3, in some implementations, monitoring code is added to the web page code (320). For example, Monitoring Code 420 of FIG. 4 can be injected into Modified Web Page Code 220 at Monitoring Module 424. Monitoring Code 420 can include JavaScript code that is configured to detect when malicious code is injected into Decoy Code 412. For example, Monitoring Code 420 can include JavaScript that can analyze elements of Decoy Code 412 to perform a code comparison to detect elements that are present in decoy code as it exists on a client device but not in original Decoy Code 412 that was added to Web Page Code 212 at 316 of FIG. 3. For instance, Monitoring Code 420 can be configured to read the static content of Decoy Code 412 (e.g. via object.innerHTML) and DOM elements of Modified Web Page Code 220. As discussed above, an end user of a client device is unlikely to interact with decoy code as it exists on the client device because is made transparent to the end user of the client device. Therefore any elements that are present in decoy code as it exists on the client device but are not present in original Decoy Code 412 added at 316 of FIG. 3 are likely to have been maliciously injected by malware.

Also or alternatively Monitoring Code 420 may include a JavaScript event listener configured to send an event to Monitoring Module 424 if Decoy Code 412 is modified. By way of example, if JavaScript is used to inject malicious code into Decoy Code 412 on a client device, the browser of the client device will automatically generate a modification event. Monitoring Code 420 can pick up these events and send a notification to Monitoring Module 424.

Monitoring code can be configured to detect insertion of malicious code at a variety of times. For example, Monitoring Code 420 can be configured to run whenever the web page associated with Modified Web Page Code 220 is loaded. Also or alternatively, Monitoring Code 420 can be configured to run periodically, e.g. every few seconds.

Various techniques can be used to ensure that monitoring code is not detected by malware. By way of example, monitoring code can be obfuscated, using obfuscation techniques described above. Alternatively, in order to avoid detection by malware, monitoring for injections of malicious code need not be performed on a client device. By way of example, a client device can periodically send samples of web page code that is being rendered on the client device to Monitoring Module 424. A code comparison can be performed at Monitoring Module 424 and injected code in the samples of web page code can be detected, as described below.

Returning to FIG. 3, the web page code modified at 312-320 is transmitted to the client device (324). For instance, Modified Web Page Code 220 of FIG. 4 might represent the login page of the banking website, discussed above, and might be transmitted for rendering in a browser on a customer's smart phone.

According to some implementations, injected code is detected in the decoy code (328). Injected code can be detected in a variety of ways. For instance, Monitoring Code 420 can detect injected code using the code comparison and/or event listening techniques described above. As discussed below in the context of 332 of FIG. 3, a client device can send a notification to Monitoring Module 424 whenever Monitoring Code 420 detects injected code on the client device.

In some implementations, a monitoring module located on a server or network device can detect when malicious code is injected into decoy code even if monitoring code is not operating on a client device. By way of example, Monitoring Module 424, can store an original reference version of Decoy Code 412 and can be configured to periodically receive samples of decoy code from a client device of web page code that is being rendered on the client device. Monitoring Module 424 can perform a standard code comparison between the sample decoy code in and the original reference version of Decoy Code 412. Monitoring Module 424 can identify any code that is present in the sample decoy code, but not present in the original reference version of Decoy Code 412. Therefore, Monitoring Module 424 can be used to detect malicious injected code, even if monitoring code is not operating on a client device.

According to some implementations, a notification is received that injected code was detected in the decoy code (332). For instance, such a notification can be received at Monitoring Module 424 of FIG. 4 from Monitoring Code 420. By way of example, injection of malicious code can be detected by Monitoring Code 420 operating on a client device at 328 of FIG. 3. Asynchronized data transfer (e.g., ajax POSTs) can be used to send an alert indicating the detection of injected code to Monitoring Module 424. Meanwhile, an end user of the client device can be alerted of the detection of injected code by way of a pop up message presented on a display of the client device.

Also or alternatively, in response to receiving the alert indicating the detection of injected code, Monitoring Module 424 can alert the appropriate authorities (e.g. law enforcement authorities and/or the entity in charge of the web page associated with Web Page Code 212) of the detection of injected code. Along these lines, the appropriate authorities can also be notified of the identity of the user of the client device, so they can ensure that sensitive information has not been stolen or otherwise take appropriate action.

Figure 5:
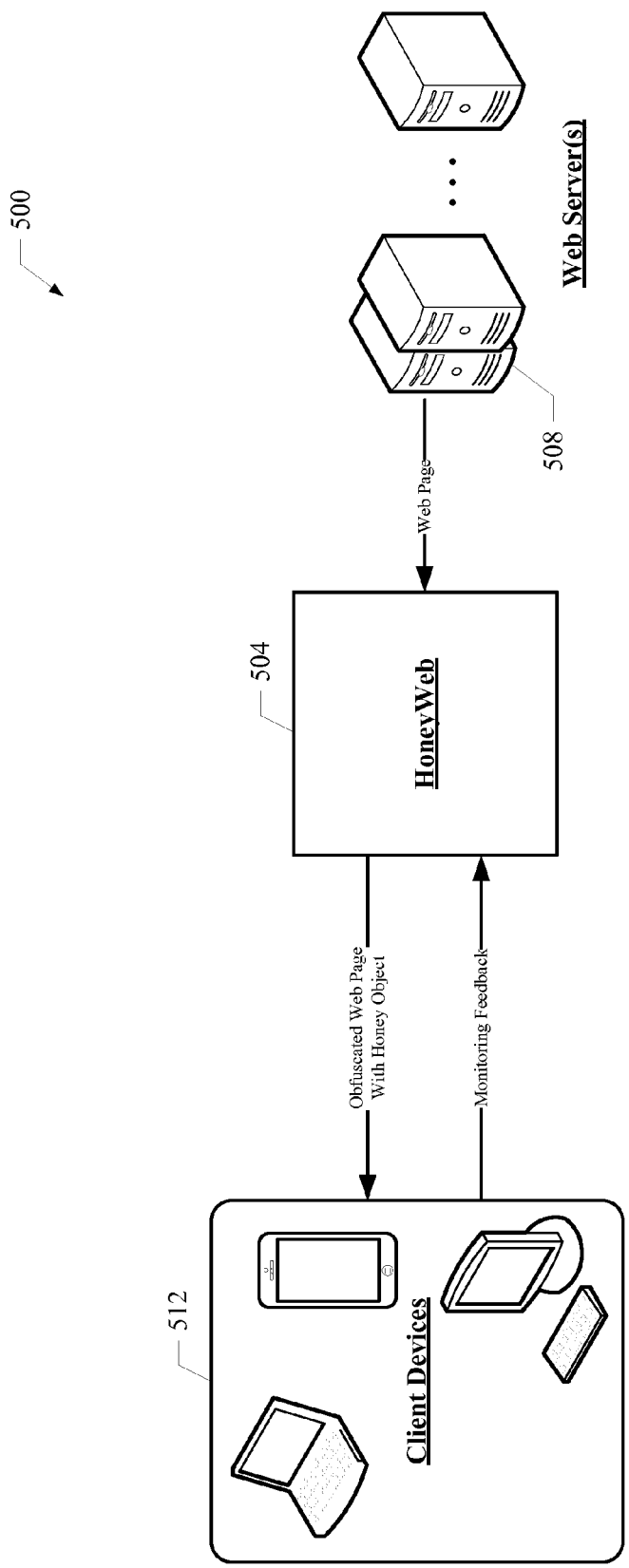
FIG. 5 is a simplified diagram of a computing environment in which particular implementations enabled by the present disclosure may be practiced.

One having skill in the art would appreciate that the disclosed techniques can be applied in a diverse array of computing environments in a variety of context. For instance, FIG. 5 shows an example of a computing environment 500 where Honey Web 504 acts as a reverse proxy mediating communication between web servers 508 and client devices 512. Honey Web 504 can include some or all of the modules of Honey Web 216 depicted in FIG. 4. Honey Web 504 can reside in a variety of places such as on one or more physical and/or virtual servers. As will be understood, the depicted devices represent a much greater diversity of device types that might be included in computing environment 500. And like network 108 of FIG. 1, computing environment 500 can represent any subset or combination of a wide array of network environments, including the internet, public networks, private networks, local area networks, TCP/IP-based networks, telecommunications networks, wireless networks, cable networks, etc. Computing environment 500 can optionally include a wide variety of client devices 512 such as desktop computers, laptop computers, tablets, smartphones, set top boxes, wearable computing devices, etc.

In another useful application of the disclosed techniques, automated malware signature extraction can be used to keep up with evolving MitB attacks. By way of example, an automatic signature extraction system such as Zarathustra can be used to periodically extract signatures from malware. The modules of Honey Web 216 of FIG. 4 can be updated with such information so that Target Code 400 corresponding to the periodically extracted malware signatures can be obfuscated in Obfuscation Module 404 and Decoy Code 412 can be injected at Injection Module 416, using the techniques described above.

It will be understood by those skilled in the art that changes in the form and details of the implementations described herein may be made without departing from the scope of this disclosure. In addition, although various advantages, aspects, and objects have been described with reference to various implementations, the scope of this disclosure should not be limited by reference to such advantages, aspects, and objects. Rather, the scope of this disclosure should be determined with reference to the appended claims.

What is claimed is:

1. A method, comprising:
generating modified web page code by:
adding decoy code to web page code, wherein the decoy code is designed to be recognized by malware as web code that is vulnerable to attack;
adding monitoring code to the web page code, wherein the monitoring code is configured to detect interaction between malicious code and the decoy code when the modified web page code is executed at the client device;
transmitting the modified web page code to the client device;
wherein the method is performed by one or more computing devices.

2. The method of claim 1, wherein the decoy code is added to a comments section of the web page code that is not rendered by a browser executing on the client device.

3. The method of claim 1, wherein the decoy code is configured to render the interaction between the malicious code and the decoy code harmless.

4. The method of claim 1, further comprising:
receiving a notification from the monitoring code that the interaction between the malicious code and the decoy code was detected.

5. The method of claim 1, wherein the monitoring code is further configured to generate one or more notifications in response to detecting one or more interactions between any malicious code and the decoy code.

6. The method of claim 1, further comprising detecting a change to the decoy code caused by interaction between the malicious code and the decoy code.

7. The method of claim 6, wherein detecting the decoy code comprises:
receiving sample web page code from the client device comprising elements of the decoy code at the client device;
comparing the sample web page code to reference web page code comprising original elements of the decoy code added to the web page code; and
determining that the sample web page code does not match the reference web page code.

8. The method of claim 1, wherein the decoy code is configured to be obscured when the modified web page code is rendered on a browser executing on the client device.

9. The method of claim 1, wherein the decoy code includes a dynamic ID.

10. A system, comprising:
one or more hardware processors;
memory coupled to the one or more hardware processors and storing one or more instructions which, when executed by the one or more hardware processors, cause the one or more hardware processors to:
generate modified web page code by:
adding decoy code to web page code, wherein the decoy code is designed to be recognized by malware as web code that is vulnerable to attack; and
adding monitoring code to the web page code, wherein the monitoring code is configured to detect interaction between malicious code and the decoy code when the modified web page code is executed at the client device;
transmit the modified web page code to the client device.

11. The system of claim 10, wherein the decoy code is added to a comments section of the web page code that is not rendered by a browser executing on the client device.

12. The system of claim 10, wherein the decoy code is configured to render the interaction between the malicious code and the decoy code harmless.

13. The system of claim 10, wherein the one or more instructions, when executed by the one or more hardware processors, further cause the one or more hardware processors to:
receive a notification from the monitoring code that the interaction between the malicious code and the decoy code was detected.

14. The system of claim 10, wherein the monitoring code is further configured to generate one or more notifications in response to detecting one or more interactions between any malicious code and the decoy code.

15. The system of claim 10, wherein the one or more instructions, when executed by the one or more hardware processors, further cause the one or more hardware processors to:
detect a change to the decoy code caused by interaction between the malicious code and the decoy code.

16. The system of claim 15, wherein detecting the change to the decoy code comprises:
receiving sample web page code from the client device comprising elements of the decoy code at the client device;
comparing the sample web page code to reference web page code comprising original elements of the decoy code added to the web page code; and
determining that the sample web page code does not match the reference web page code.

17. The system of claim 10, wherein the decoy code is configured to be obscured when the modified web page code is rendered on a browser executing on the client device.

18. The system of claim 10, wherein the decoy code includes a dynamic ID.

19. One or more non-transitory computer-readable media storing instructions which, when executed by one or more hardware processors, cause the one or more hardware processors to:
generate modified web page code by:
adding decoy code to web page code, wherein the decoy code is designed to be recognized by malware as web code that is vulnerable to attack; and
adding monitoring code to the web page code, wherein the monitoring code is configured to detect interaction between malicious code and the decoy code when the modified web page code is executed at the client device;
transmit the modified web page code to the client device.

20. The non-transitory computer-readable media of claim 19, wherein the decoy code is configured to render the interaction between the malicious code and the decoy code harmless.

21. The non-transitory computer-readable media of claim 19, wherein the one or more instructions, when executed by the one or more hardware processors, further cause the one or more hardware processors to:
receive a notification from the monitoring code that the interaction between the malicious code and the decoy code was detected.

22. The non-transitory computer-readable media of claim 19, wherein the one or more instructions, when executed by the one or more hardware processors, further cause the one or more hardware processors to:
detect a change to the decoy code caused by interaction between the malicious code and the decoy code.

23. The non-transitory computer-readable media of claim 22, wherein detecting the change to the decoy code comprises:
receiving sample web page code from the client device comprising elements of the decoy code at the client device;
comparing the sample web page code to reference web page code comprising original elements of the decoy code added to the web page code; and
determining that the sample web page code does not match the reference web page code.

24. The non-transitory computer-readable media of claim 19, wherein the decoy code is configured to be obscured when the modified web page code is rendered on a browser executing on the client device.

* * * * *